United States Patent [19]

Livingston

[11] Patent Number: 4,960,180
[45] Date of Patent: Oct. 2, 1990

[54] WHEELCHAIR

[75] Inventor: Troy W. Livingston, Northbrook, Ill.

[73] Assignee: Livingston Products, Inc., Northbrook, Ill.

[21] Appl. No.: 194,680

[22] Filed: May 13, 1988

[51] Int. Cl.$^5$ .............................. B62D 55.04
[52] U.S. Cl. ................. 180/9.28; 180/907; 280/5.22; 280/250.1
[58] Field of Search ............. 180/6.7, 9.1, 9.26, 180/9.28, 9.32, 9.34; 280/250.1, 304.1, 907, 5.2, 5.22, DIG. 10

[56] References Cited

U.S. PATENT DOCUMENTS

| | | | |
|---|---|---|---|
| 3,191,953 | 6/1965 | Aysta | 280/242 WC |
| 3,609,804 | 10/1971 | Morrison | 180/9.32 |
| 4,411,330 | 10/1983 | Blokland | 180/198 |
| 4,556,229 | 12/1985 | Bihler et al. | 280/304.1 |
| 4,556,706 | 1/1986 | Bihler et al. | 280/250.1 |
| 4,688,843 | 8/1987 | Hall | 280/242 WC |

Primary Examiner—Charles A. Marmor
Assistant Examiner—Mitchell Bompey
Attorney, Agent, or Firm—Fitch, Even, Tabin & Flannery

[57] ABSTRACT

A wheelchair is provided with an endless track drive for travel over rough ground. The endless track drive is detachably connected to the wheelchair by a frame such that a lower run of each of the endless tracks is located adjacent a lower periphery of each wheel. The chair in the wheelchair is kept low so that the occupant is not lifted so high as to experience a substantially different elevation when travelling on the endless track as when traveling on the wheels. A suspension preferably in the form of a flexible sheet allows one forward end of an endless track to be moved vertically independently of the forward end of the other endless tracks. Preferably, the endless drive is an attachment that is easily clamped to the wheelchair and is made mostly of plastic that is lightweight and easily cleaned and provides a low cost for the attachment.

7 Claims, 4 Drawing Sheets

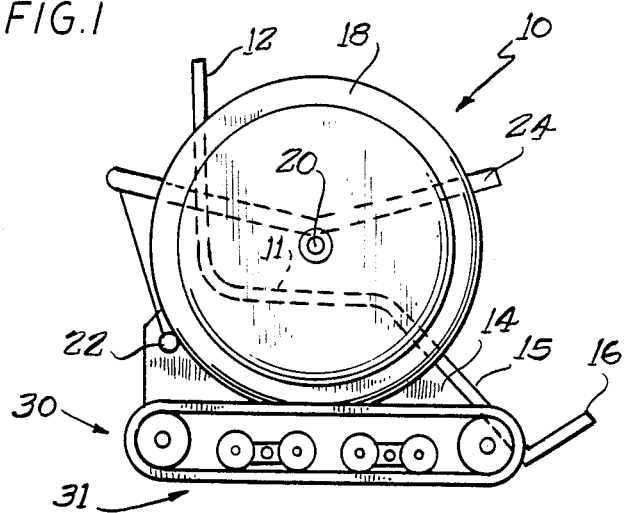
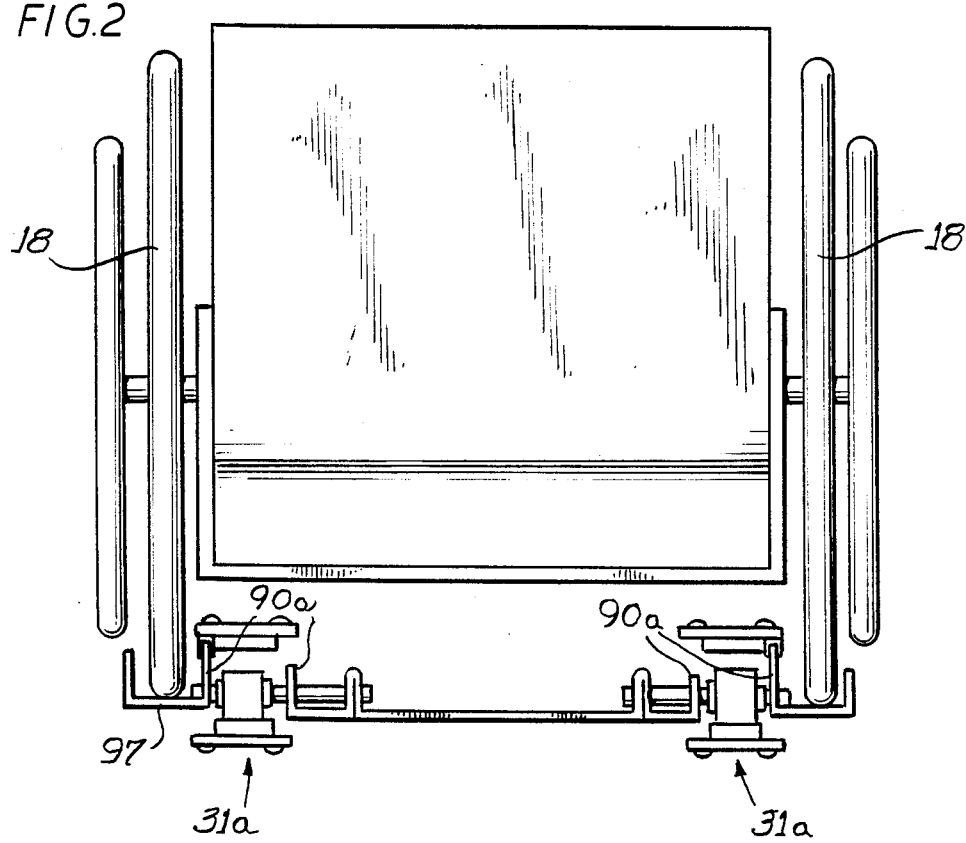

WHEELCHAIR

This invention relates a wheelchair apparatus and, more particularly, to a wheelchair apparatus capable of negotiating rough terrain.

BACKGROUND OF THE INVENTION

Presently, available wheelchairs use round wheels which roll very well on smooth floors or on concrete or other paved surfaces which are relatively smooth. The propelling of the wheelchair either by a person or by the use of a motor, however presents great difficulty over uneven or soft terrain, which can be a typical grassy field, or a rocky or sandy area. Teenagers and others do not like to be lifted and carried to the water or onto a beach and would much prefer to have a wheelchair which would enable them to negotiate the rough surface of a beach as well as soft sand. Pebbles or stones act as a block when they hit the wheel of the wheelchair and the soft sand may allow the wheels to sink because of the very narrow surface area under the wheels to support the weight.

Preferably a rough terrain wheelchair would be one which can be readily cleaned if it were pushed fields in which there is mud or sand which can become clogged in the tracks. In addition to being easily cleaned, there is a particular need for such wheelchairs which will be able move across openings or holes in the ground and which will be able to negotiate over small rocks and pebbles without being blocked like the current wheelchair wheels which are often blocked when the user tries to negotiate rough terrain. A further consideration with respect to having a practical wheelchair which may be readily used and adopted is to provide one which is suspended such that the rider will be able to negotiate over small rocks, holes or other obstacles on the rough terrain without tilting to the extent that the occupant will or will fear tipping over. Manifestly, if the wheelchair occupant is alone and is tipped over, he would have great difficulty righting himself and getting the chair back up into its normal upright position. Also, it is preferred that the rough terrain wheelchair have a low profile like that of existing wheelchairs. That is, the wheelchair should not be so elevated that the user is uncomfortable. Thus, the wheelchair should have a low profile and have an independent suspension of the frame and the chair such that the tracks or portions thereof may be deflected at different degrees at the area of the particular rock or projection without tilting the seat and occupant.

In addition to the operating characteristics of a rough terrain wheelchair, it is preferred that the invention include a convertible unit or a retrofit addition to existing wheelchairs, which would allow the user of an existing wheelchair to have attached thereto a track assembly device which could be used over rough terrain and then detached at a later time, either for cleaning or to allow the user to return to the wheelchair to its normal circular wheel locomotion.

Another overriding concern for a rough terrain wheelchair is that it be constructed in an economic manner such that it can be purchased readily by people either for themselves or by other organizations for them.

Accordingly, an object of the present invention is to provide a new and improved wheelchair capable of moving over rough terrain. A further object of the invention is to provide a wheelchair with a retrofit device which will provide a track mechanism allowing the ordinary wheelchair to move over a rough terrain.

These and other objects and advantages of the invention will become apparent from the following detailed description taken in connection with an accompanying drawing in which:

BRIEF DESCRIPTION OF THE DRAWINGS

FIG. 1 is a wheelchair constructed in accordance with a preferred embodiment of the invention.

FIG. 2 is a rear view of a wheelchair retrofit embodiment of the invention showing an inboard track arrangement.

DESCRIPTION OF THE PREFERRED EMBODIMENT

Figure 3:
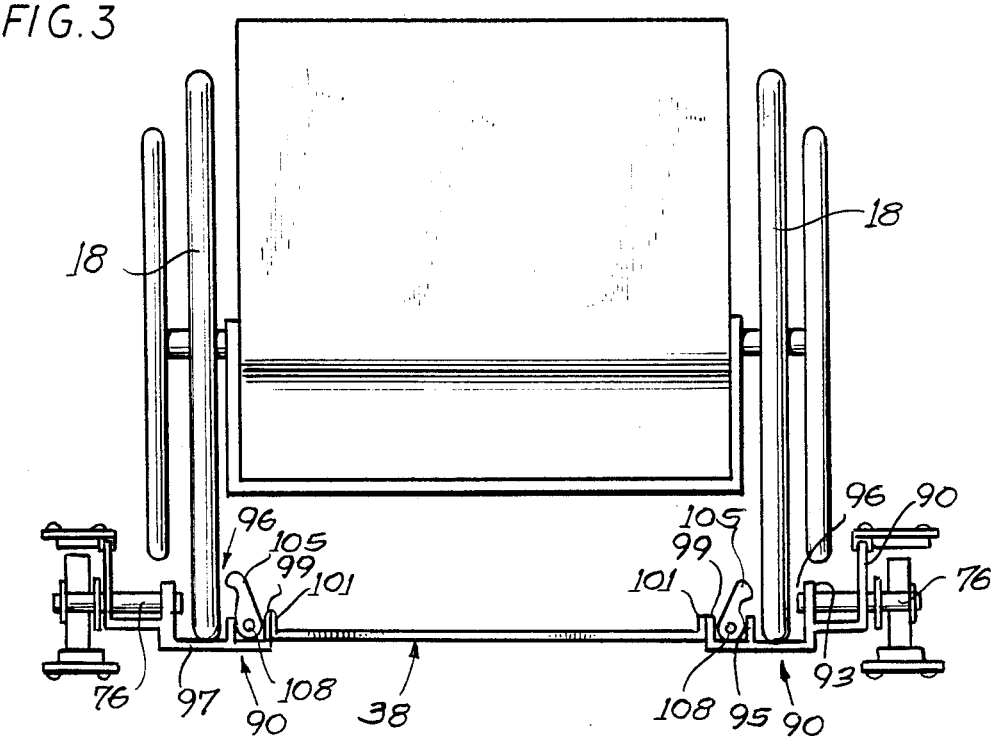
FIG. 3 is a rear view of the embodiment of the invention in which the track assembly is retrofitted outside the existing wheelchair wheels.

As shown in the drawings for purposes of illustration, the invention is embodied in a wheelchair 10 which has a seat 11 and a back 12 for the seat, which is mounted on a suitable supporting frame 14. A leg rest 15 and a foot rest 16 are also provided in the known manner. The wheelchair is also provided with a pair circular wheels 18 which rotate about axles 20 which are mounted into the frame 14 all in a known manner. By way of illustration only, there is a brake pad 22 which is operated by a lever system 24 to retard movement of a wheel. The above-described wheelchair is by way of illustration only, and it, of course, has other components which are common with commercially available wheelchairs and the construction is not limited to any particular wheelchair.

The present invention is directed to providing the wheelchair 10 with an improved ability to move over rough terrain and traverse over small rocks, holes or other obstructions which would otherwise impede the operation or the turning of the wheels 18. The present invention is also particularly adapted to be used to move across small potholes or other holes in rough terrains such as fields and to negotiate beaches or other sandy areas where pebbles or rocks may also be present. Also, there is a need for wheelchairs for people who want to traverse beaches or rough terrains to be able to go through water, mud or sand which may cling to the operating parts. Thus, there is a need for a wheelchair device for moving over such terrain and one which can be readily cleaned.

Still another problem with the commercialization of the rough terrain wheelchair is that the device preferably be one that could be detached from an existing wheelchair so that the existing wheelchair can be used in the normal homes and on the sidewalks or streets. The attachment should be of a relatively low cost so that it can be readily afforded. On the other hand, the rough terrain wheelchair may be used and be provided as a permanent wheelchair rather than as an addition to an existing wheelchair. Preferably, such rough terrain wheelchairs would either be manually pushed or be motorized as the case may be.

Figure 4:
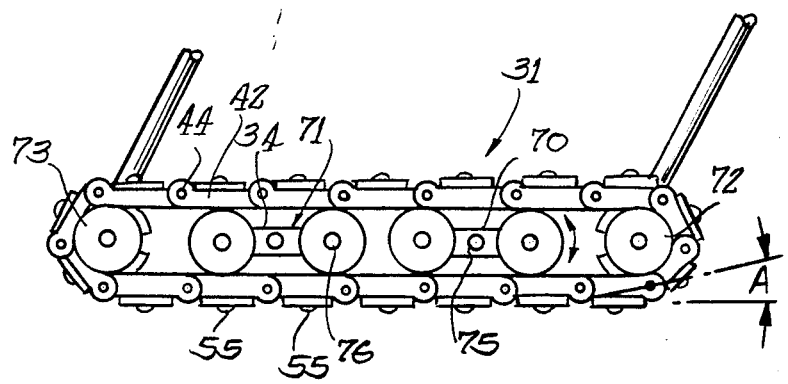
FIG. 4 is a view of a preferred track assembly.

In accordance with the present invention, there is provided a new and improved wheelchair 10 which has a track assembly 30 included individual endless tracks 31 which are linked belt-type of tracks such as shown in FIG. 4. The linked belt tracks are mounted with trucks 34 so that the tracks 31 may deflect over projections which may pass under causing individual portions of the flexible tracks to deflect relative to other parts of the track. This is achieved in the preferred embodiment of the invention by an independent flexible suspension means, preferably in the form of a pan 38, as best seen in FIG. 3 which is connected between the four corners of the frame and is also directly connected to the left and right tracks to form a unit. Because the pan is very thin and flexible, as will be described hereinafter, it allows the upward movement of one end of the track relative to another end of the track or movement of a middle portion of the track relative to an end portion of the track without requiring an expensive individual four-spring suspension mounting, which could be used but is not necessary with the present invention.

Also, in accordance with the further embodiments of the invention as will be described in connection with FIGS. 3 and 8, there is a detachable mounting means 40 which allows the track assembly 30 to be detachably connected to the wheelchair and in particular to the wheels 18. The particular feature of the detachability allows a unit which can be readily attached (or detached for cleaning or regular use) for use when the wheelchair is desired to go over rough terrain.

Figure 5:
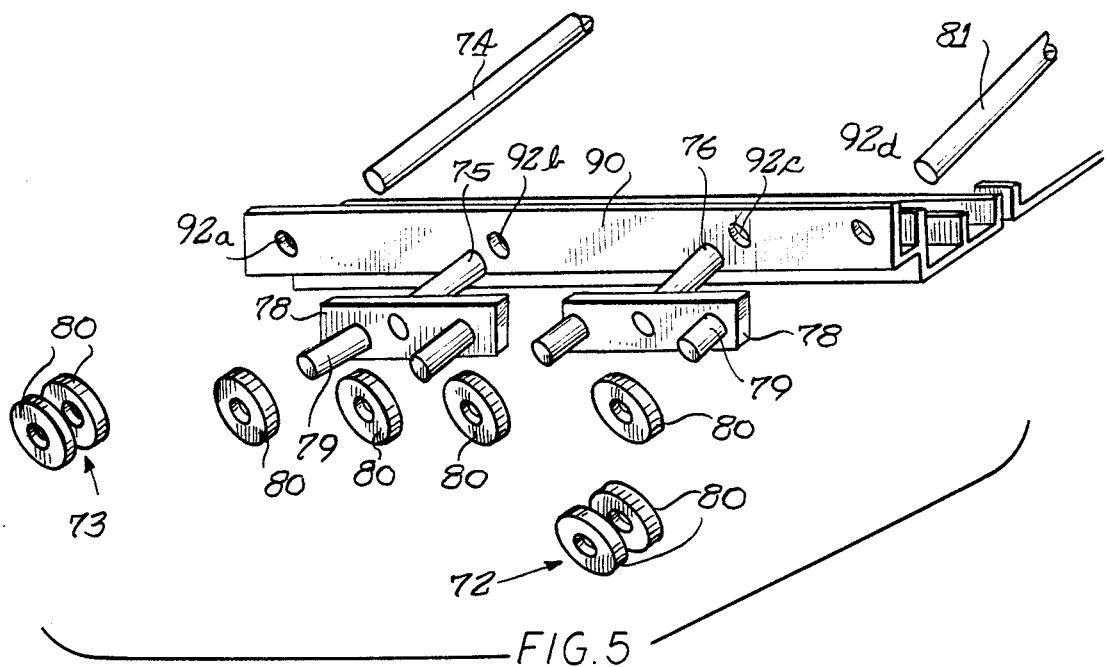
FIG. 5 is an exploded view of the track assembly constructed in accordance with the preferred embodiment invention.
Figure 6:
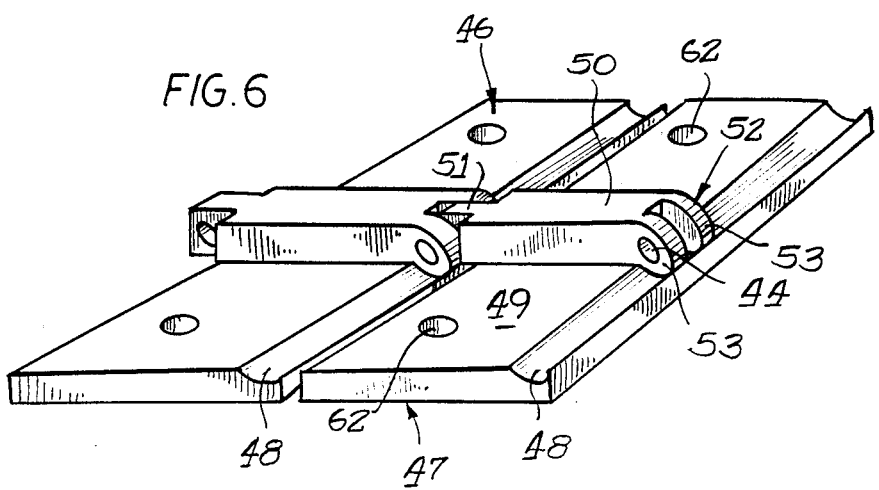
FIG. 6 is a view of the length of the track assembly.

Referring now in greater detail to the illustrated and preferred embodiment of the invention, it will be seen in FIGS. 4 and 5 that the preferred track assembly includes the track 31 which preferably is in the form of a series of track plates or links 42 which are pivotably connected to one another by a pivot means preferably in the form of pivot pins 44 which join each of the successive link plates 42 into an endless oblong track disposed around the trucks 34. The illustrated and preferred link plates, as best seen in FIG. 6, are integral plastic pieces having portions in the form of flat plates 46 which have flat bottom surfaces 47 for engaging the terrain and which have curved trailing grooves 48 on their interior surfaces 49. Integral with the plates 46 of is a central projection or connecting lug 50 which has at one end a projecting finger 51 and a projecting fork 52 at the other end with a space 53 between the forked end to receive the projection 51 of another following link plate. A stainless steel pivot pin 44 is pushed through the respective ears 53 of the forked portion 52 and through a similar opening in the projection finger 51 to pivotably connect adjacent links. Since each of the links are identical, they will be readily and simply joined together to form an endless track by means of only a few pins and a few pieces for the links.

Figure 7:
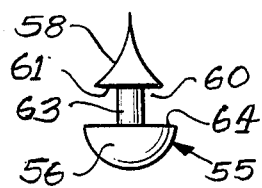
FIG. 7 is a side elevational view of a pad used with the track assembly in FIG. 6.

The preferred links are made of plastic and are made very inexpensive by a molding process, and they can be readily cleaned. To prevent slipping of the plastic on the terrain and to also provide for a quieter ride, it is preferred to have rubber pads 55 on each of the link plates 42. The preferred rubber pad 55 is shown in FIG. 7 as having a curved semi-hemispherical pad head 56. The detachable pads 55 may be attached to the plates in various manners and herein are shown with a push head 58, which is of a conical tapered shape, and has a larger lower diameter shoulder 61 defining a circular recess 60 about a cylindrical stem 63 which joins the push head 58 to the pad head 56. By pushing the tapered head 58 through a sized hole 62 in the link plate 42, elastomeric conical lower shoulder 61 may be squeezed through the hole 62 until it is on the top side of the plate at which the shoulder 61 will again expand to prevent outward movement of the push head from the hole 62. The hole 62 is sized about the same as the diameter of the cylindrical stem 63 on the pad so that the enlarged head will have its lower or upper side 64 abutting the lower side of the link plate. Manifestly, the manner of attachment of elastomeric pads 55 and their numbers may be changed considerably from that shown herein. Thus, it will be seen that an inexpensive link plate may be used and that inexpensive elastomeric pads may be provided on the link plate for providing friction on smooth or slippery surfaces and as well to provide a more quiet movement of the plastic plates across hard surfaces such as roads or floors or other materials.

The illustrated link plates may be commercially available conveyor plates which are about 1.5 inches from one pivot pin 44 to another pivot pin 44 and which may be about 3.5 inches in width with about a two-inch spacing between the pads 55. Manifestly, these dimensions and sizes and shapes for the link plates are by way of example only.

Figure 5A:
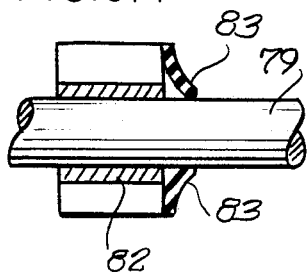
FIG. 5A is a partially sectioned, diagrammatic view of bearings and rubber seals for the bearings mounted on a shaft.

In the preferred and illustrated embodiment of the invention, the track assembly includes a track 31 as shown in FIG. 4 which has a pair of intermediate trucks 70 and 71 as well as an end trucks 72 and 73. The intermediate trucks are adapted pivot about central axles 75 and 76. As can best be seen in FIG. 5, each of the axles 75 and 76 projects horizontally from an upstanding flat truck plate 78. Each of the plates 78 supports a pair of horizontally projecting roller shafts or axles 79 of cylindrical shape. On each axles 79 is mounted an elastomeric roller 80 for rotation about the axle. The rollers 80 are suitably held on to the shafts by C-rings and are mounted thereon by internal tubular bearings 82, as best seen in FIG. 5a. The bearings 82 are mounted in the bores of the rollers and a suitable small rubberseal 83 may be provided to have a seal to the axle 79 to prevent material from getting into the bearing 82. The preferred rollers 80 have outer diameters sized to extend between and to engage and to support the undersides 47 of the link plates 42, as best seen in FIG. 4. The intermediate truck plates 78 may pivot about their central pivot shafts 75 should a rock or other projection cause one of the rollers on a truck plate to move up or down.

The outer two most trucks 72 and 73 have truck rollers 80 mounted on long continuous axles 74 and 81 which extend completely across from one track 31 on the right-hand side of the wheelchair to the opposite track 31 on the left side of the wheelchair. In this instance, the front and rear trucks 72 and 73 each comprise a pair of side-by-side rollers 80 which are identical to the rollers 80 used for the other trucks and have internal bearings. If desired, the locations of the axle 75 and 76 for the intermediate trucks may be positioned in a horizontal plane and the forward continuous axle 81 may be raised slightly above the horizontal plane so that the front truck rollers 80 are slightly lifted and thereby define an upwardly inclined lead-in for the track at a slight angle of inclination; for example, about one-half of an inch or less in the upward forward direction as indicated by the directional arrows and dimension A in FIG. 4. This should assist in movement over rocks or other obstacles. Manifestly, such an upward movement-/lift may not be needed.

A low cost track 31 is particularly provided by the use of frame members or extrusions 90 for the track assemblies, which are relatively inexpensive channelled-shape extrusions which may be made in one piece and of lightweight metal such as aluminum to provide a lightweight structure as well as one that can be easily cleaned. The preferred frame members 90 for the track are multi-channeled extrusions which have the openings 92a, 92b, 92c and 92d for receiving the respectively the rear axle 74, the truck plate shafts 75 and 76 for intermediate trucks, and the front continuous axle 81. Both the front and rear axles 74 and 81 extend across underneath the wheelchair to a similar opening 92d in the other frame extrusion or member 90 on the opposite side of the wheelchair. As seen in FIG. 3 the extrusion also contains an inner upstanding flange 93 which is parallel to the outer upstanding flange 91 and the small axles 75 and 76 for the trucks are received in openings in the flange 91 aligned with the openings 92b and 92c in the flange 91 to mount the trucks steadily and sturdily in the extrusion. A third upstanding flange 95 on the extrusion frame member defines with the upstanding flange 93 an elongated wheel receiving channel or groove 96 into which the wheel is positioned with the wheel position resting on a bottom web 97 of the channel 96. A fourth upstanding flange 99 is provided on the extrusion frame member 90 and it is secured along its full length in a suitable manner as by fasteners or welding to a suspension plate means 38.

Referring now in greater detail to this suspension plate means 38, it provides a flexible mounting for the respective track means such that when a forward truck roller 80 on the front axle 80 may move upwardly while the center two trucks 70 and 71 and the rear truck 73 remain down on a horizontal surface. The preferred and illustrated suspension means is made extremely simple and very economical by the use of a suspension means which is merely a flat metal sheet or pan which has a very thin metal; for example, 0.025 inch thick and which extends completely across between the opposed upstanding flanges 99 on the respective left and right frame extrusions 90. Herein, the pan is shown having upturned flanged ends 101 which are connected by fasteners or welding to the extrusion flanges 99 throughout their length, so as to provide a relatively rigid interconnection therebetween. Thus, when any one of the trucks moves upwardly, it will move a portion of the extrusion and cause an upwardly twisting of the pan whereupon having passed over a rock or other upstanding projection, the flexed metal in the pan will again exert a returning force bending down to take the twist out of it, thereby moving the raised truck down. Irrespective of upward movement of a rear truck, or a front or intermediate truck, the pan flexing will occur at an area of the pan and allow the independent suspension at a very low cost manner. This suspension isolates the person seated in the wheelchair from a rougher ride and from tilting angles that may scare or tip over the person in the chair.

In FIG. 2 it is shown that the present invention with the extrusions provides a very low profile which is extremely important in that the user of the wheelchair will feel he rides at essentially the same height and has essentially the same movement with or without the track assembly 30. Herein, as shown in FIG. 2, it is preferred that the distance between the bottom web 97 of the extrusion and the bottom surface 47 of a track is only approximately one inch or less. This is a very low profile which is to be advantageous to the user because his perception and feel and should be generally similar to that experienced when he is in wheelchair without the tracks and just riding on the wheels 18.

Whereas an embodiment shown in FIG. 1 the tracks 31 have been mounted exterior of the wheels 18, there is shown in FIG. 2 is a similar version in which tracks 31a are mounted inside of the wheels 18 by extrusion members 90a with a suspension pan means 38a extending between the respective extrusions member 90a, the tracks 31a may be made in a similar manner as above-described.

Figure 8:
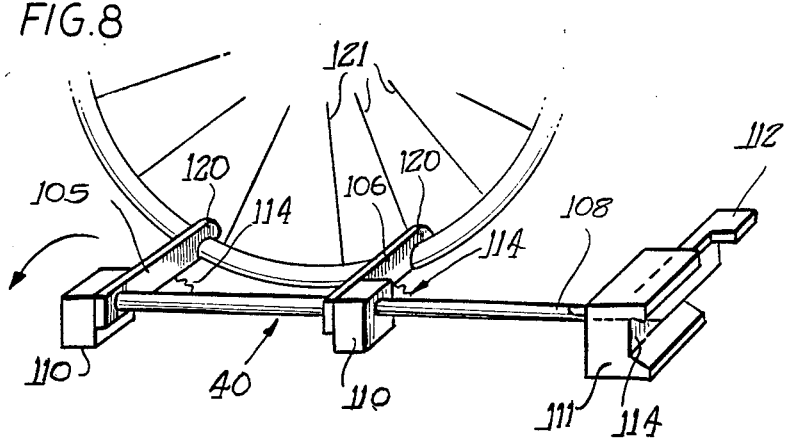
FIG. 8 illustrates the attaching mechanism for attaching the track assembly to an existing wheelchair.

The illustrated detachable connection means is shown in FIGS. 3 and 8 and includes a pair of pivotable locking bars 105 and 106 which are mounted on a common support shaft 108. The common support shaft 108 is mounted in a series of blocks 110 which are mounted in the channel between the upstanding members 95 and 99 in the extrusion member 90. An outer block 111 serves as a lock member for a foot-operated lever 112 which is welded to an end of the shaft 108. Springs 114 are compressed between the locking bars 105 and 106 and the channel frame extrusion 90 to urge the locking arms 105 and 106 to an upper release position. To lock the same, the locking lever is received within a groove 114, as best seen in FIG. 8 on an outer side of the block 111. Thus, by foot operation, the locking bars 105 and 106 may be swung down into engagement to cause the locking bars to clamp with their curved hooked ends 120 on top of the wheel and between spokes 121 of the wheel, as best seen in FIG. 8. By moving the catch release, i.e. the lever 112 from the groove 114 by operating foot lever 112, the springs may be allowed to flip up the locking bars to an unlocking position, so that assembly may be removed from the wheelchair.

Figure 4A:
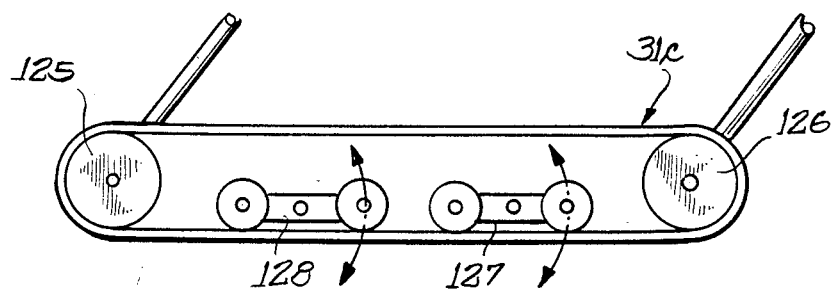
FIG. 4A is a partial side elevation view of another embodiment of the invention having a rubber band type of track.

As shown in FIG. 4a, there are provided trucks 127 and 128, but in lieu of the pivoted linked plates, there is provided a continuous rubber band-type of track 31c which may be used as the track rather than link belt. The shape of the nature of the trucks and wheels may also be changed have large axle wheels 125 and 126, as shown in FIG. 4a, in combination with other intermediate trucks 127 and 128, which are mounted on to frame extrusions 90 in the manner above described. The particular track construction may be varied and still fall within the purview of the invention.

Figure 9:
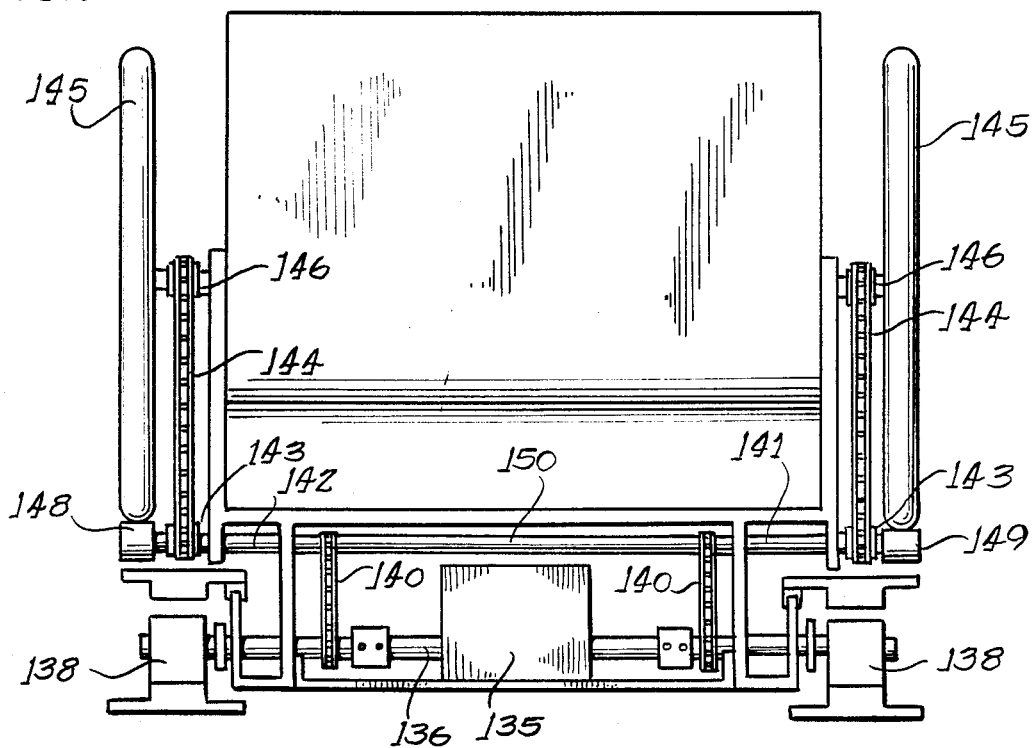
FIG. 9 shows the track assembly constructed in accordance with another embodiment of the invention for a motorized wheelchair.

Another embodiment of the invention illustrated in FIG. 9, there is provided a motorized version of the present invention in which there is an electric motor or gear box 135 which is mounted below the driver with a battery and this motor drives a shaft 136. The shaft 136 extends out to end drive sprockets 138 which drive the respective tracks 31. The drive may also extend upwardly from the shaft 136 through a pair of chain drives 140 to outer shafts 141 and 142 which are hollowed tubes on which are mounted sprockets 143 which drive chains 144 which are connected to sprockets 146 on axle 144 for the respective drive wheels 145. The drive wheels 145 may be used to move the wheelchair when the motor is not operating, preferably in a known manner. The equipment provides a pair of cam brakes 148 and 149, each of which are mounted on a common shaft 150, which extends through the hollow tubes 141 and 142. A lever such as the lever 12 (FIG. 1) may be pulled to turn one cam brakes 148 or 149 into engagement with a rotating wheel 145 to stop movement on that side while the other drive wheel 145 is allowed to continue to turn to cause a turning movement with the stopping of the movement of the one track. Manifestly, the same type of turning operation may be obtained in the FIG. 1 embodiment by the operating of brake lever 12 to shift the brake 22 into engagement with the wheel 18 on one side to cause it to stop turning while the track is moving on the other side to spin the wheelchair about the stopped track.

Figure 9A:
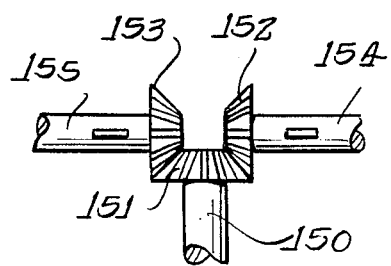
FIG. 9A illustrates a gear box drive for the wheels.

As best illustrated in FIG. 9a, a drive may be provided for the respective wheels through a gear box or other device which has a driving input shaft 150 having a double gear 151 thereon which drives bevel gears 152 and 153 which are connected to shafts 154 and 155 for driving respective tracks. When one of the bevel gears 152 or 153 is stopped because the brake has been applied, the other bevel gear and its associated shaft will continue to operate and turn causing the turning movement.

From the foregoing it will be seen that there is provided a new and improved wheelchair mechanism which is formed of inexpensive parts and which can be readily attached or detached in some instances, or which may be made a permanent part of the machine. The track assemblies are made, as well as the suspension assembly, with relatively few and inexpensive parts so that the device may be very cost effective. The device also has a low profile and is made with materials and pieces that can be easily cleaned and maintained.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What is claimed is:

1. A wheelchair apparatus having a wheeled drive for travel over smooth hard surfaces and an endless track drive for travel over outdoor ground and rough terrain, said apparatus comprising:
   a wheelchair having first and second wheels having lower peripheries for travel over smooth hard surfaces,
   an attachment for connection to the wheelchair and having frame means for supporting the wheelchair for travel when using the endless tracked drive,
   a chair in said wheelchair having the same fixed relationship with respect to the wheels and to the frame means when traveling over smooth hard surfaces or when travelling over rough terrain,
   a pair of endless track means supported by said frame means each with an upper track run and a substantially lower horizontal track run to travel horizontally along the rough terrain,
   means readily detachably mounting the frame means and the endless track means to the wheelchair for travel on the endless track means over rough terrain and for detachment therefrom to allow the wheels to travel on the ground when the frame means is detached from the wheelchair,
   the lower periphery of each of the wheels being held by the frame means adjacent a lower run of the endless track means so that the occupant is not lifted so high as to experience a substantially different elevation when travelling on the endless track means as when travelling on said wheels,
   suspension means on the frame means mounting each of the forward ends of each of the endless track means to lift over a projection therebeneath independently of the other forward and of the other endless track means to facilitate movement over a projection with reduced tilting of the chair and its occupant,
   the pair of endless track means having a fixed relationship to the frame means and the chair to keep the upper and lower runs substantially horizontal when travelling over rough terrain.

2. A wheelchair apparatus in accordance with claim 1 in which said means readily detachably mounting the frame means and endless track means to the wheelchair comprises,
   supporting surfaces on the frame means underlying the lower peripheries of the wheels which rest on said supporting surfaces, and
   clamping means for clamping the wheels to the supporting surfaces to prevent wheel rotation or wheel lifting from the supporting surfaces when traveling along rough terrain.

3. A wheelchair apparatus in accordance with claim 1 in which the endless tracks comprise:
   a plurality of wide, flat track plates pivotally joined together to distribute the occupant's weight over wide areas to prevent them from digging into sand or soft ground,
   said plates being made of hard and smooth plastic to be lightweight to be easily cleaned of said and dirt by a water washing thereof.

4. A wheelchair apparatus in accordance with claim 1 in which the attachment is compact and flat for positioning beneath the seat and wheels of the wheelchair,
   said attachment being made of plastic and lightweight materials to be easily portable, said wheelchair being manually moved without any motor when travelling on said wheels or on said endless track means, 5. A wheelchair apparatus for traversing across rough terrain, said apparatus comprising:
   a wheelchair frame having a seat for an occupant,
   an endless drive means including first and second endless track means connected to the wheelchair frame,
   said track means having front and rear ends,
   a first frame member means extending along one side of the wheelchair frame and mounted therebelow,
   a second frame member means extending along the other side of the wheelchair frame and mounted therebelow,
   first truck means mounting the first endless track means on the first frame means,
   second truck means mounting the first endless track means on the second frame means,
   and a suspension means including a flexible sheet spanning laterally across the first and second frame member means, said flexible sheet extending from the front end to the rear end of the endless tracks, said flexible sheet deflecting at a flexed portion of the sheet adjacent a portion of the endless track means being lifted by a projection therebeneath, said flexed portion returning downwardly to lower that portion of track lifted by the underlying protection so that tilt of the wheelchair and seat is lessened when traveling over projections engaging one of the endless tracks.

6. A wheelchair apparatus in accordance with claim 5 in which the first and second frame members are channel shaped members mounted below the seat, said flexible sheet being located beneath the seat and fastened along interior facing sides of the channel shaped members.

7. A wheelchair apparatus in accordance with claim 5 in which the endless track means comprises:

a plurality of flat plates pivotally interconnected to each other, said endless plates being made of plastic and being made with smooth surfaces for washing dirt and sand therefrom, said plates being wide to distribute the weight of the occupant to prevent sinking of the wide flat plates into sand or soft ground.

* * * * *

UNITED STATES PATENT AND TRADEMARK OFFICE
CERTIFICATE OF CORRECTION

PATENT NO. : 4,960,180

DATED : October 2, 1990

INVENTOR(S) : Troy W. Livingston

Page 1 of 2

It is certified that error appears in the above-identified patent and that said Letters Patent is hereby corrected as shown below:

Column 1, Line 1, after "This", delete the hyphen.

Column 1, Line 29, after "able", insert --to--.

Column 1, Line 59, delete "to" (third occurrence).

Column 2, Line 19, change "elevation" to --elevational--.

Column 2, Line 46, after "pair", insert --of--.

Column 3, Line 7, delete "the" (first occurrence).

Column 3, Line 17, change "included" to --including--.

Column 3, Line 59, delete "of".

Column 4, Line 43, delete "an".

Column 4, Line 44, after "adapted", insert --to--.

Column 4, Line 49, change "axles" to --axle--.

Column 5, Lines 17-18, change "channelled-shape" to --channel-shaped--.

UNITED STATES PATENT AND TRADEMARK OFFICE
CERTIFICATE OF CORRECTION

PATENT NO. : 4,960,180

DATED : October 2, 1990

INVENTOR(S) : Troy W. Livingston

It is certified that error appears in the above-identified patent and that said Letters Patent is hereby corrected as shown below:

Column 5, Line 23, delete "the" (first occurrence).

Column 6, Line 16, delete "and" (second occurrence).

Column 6, Line 17, after "in", insert --a--.

Column 6, Line 21, delete "is" (second occurrence).

Column 7, Line 11, after "one", insert --of--.

Column 8, Line 14, change "and" to --end--.

Column 8, Line 49, change "," to --.--.

Column 8, Line 64, change "first" to --second--.

Signed and Sealed this

Fifth Day of May, 1992

Attest:

DOUGLAS B. COMER

Attesting Officer

Acting Commissioner of Patents and Trademarks